3,151,991
METHOD FOR CUTTING FROZEN FOODSTUFFS
Michael Emrys Evans, Corton, England, and Karl Hartmann, Bremerhafen, Germany, assignors to Lever Brothers Company, New York, N.Y., a corporation of Maine
Filed Nov. 2, 1960, Ser. No. 66,744
Claims priority, application Great Britain Nov. 4, 1959
1 Claim. (Cl. 99—192)

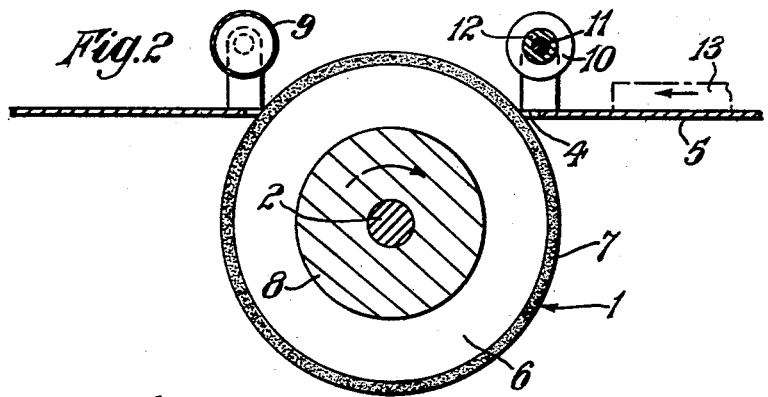
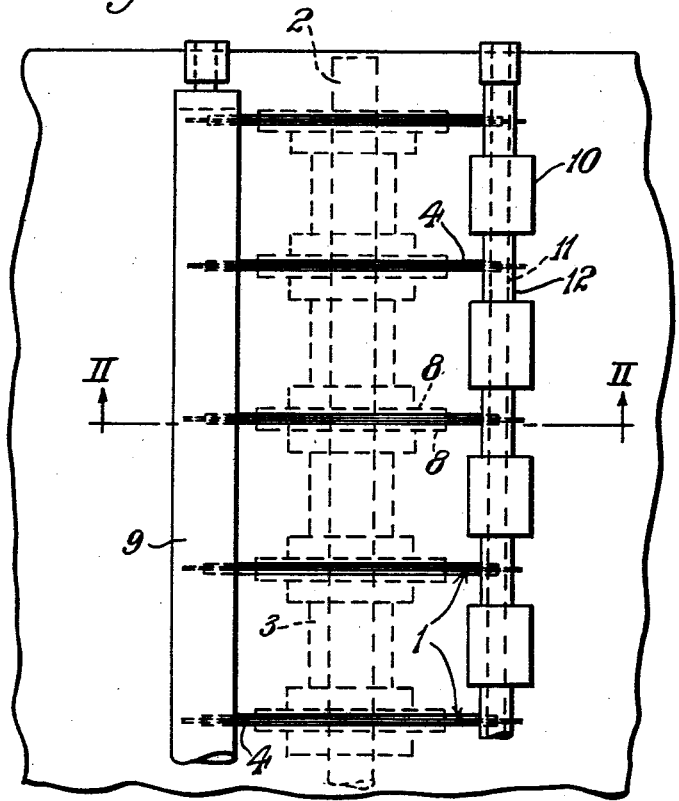

This invention relates to cutting frozen substances. It is particularly applicable to frozen foodstuffs, especially deep frozen foodstuffs at, for example, about −18° C.

Metal rotary saws having teeth can be used for cutting frozen substances, but these saws have several disadvantages. They produce unwanted sawdust which may represent a 5% to 8% waste. Also, if these saws are used for cutting deep frozen substances there is a serious risk of teeth breaking off. In the case of deep frozen foodstuffs it is necessary, therefore, to partially thaw them before cutting. This is a disadvantage if it is desired to store this cut foodstuff at a very low temperature, for example −18° C., since refreezing is then necessary.

We have discovered that deep frozen foodstuffs, particularly fish and meat, can be safely cut whilst deep frozen by a rotary cutter having diamond particles embedded in its surface.

We have also discovered that during the cutting of a slab of deep frozen fish or meat a liquid or pasty waste substance is formed instead of sawdust. We have found that if this liquid or pasty waste substance is spread onto the cut slab it re-freezes to the cut slab resulting in a reduction in unwanted waste produced by the cutting; in this way we have cut blocks of deep frozen fish with substantially no unwanted waste.

The present invention arises from these discoveries.

According to the present invention there is provided a method of cutting a frozen substance comprising cutting the frozen substance with a rotary cutter having diamond particles, or particles of a similar hardness, embedded in at least part of the surface of the rotary cutter.

The rotary cutter is preferably rotated at a high peripheral speed, for example in the range 900 to 2000 metres per minute.

The frozen substance can be a frozen foodstuff, for example fish or meat. The frozen substance can be deep frozen, for example at a temperature in the range −30° C. to −12° C.

At least some of the liquid or pasty waste substance formed by the cutting can be spread onto the cut frozen substance.

According to the invention there is also provided an apparatus comprising a rotary cutter having diamond particles, or particles of similar hardness, embedded in at least part of the surface of the rotary cutter, means for supporting a block of frozen substance to be cut by the rotary cutter, and means for spreading onto the cut block of frozen substance any liquid of pasty waste substance formed by the cutting.

The rotary cutter can comprise a thin metal disc, said particles being embedded in the surface of the rim of the disc.

The rim is preferably annular. The centre part of the disc can be made of stainless steel and the rim can be made of sintered material. Alternatively, the whole disc can be made of sintered material. On each side of the disc there can be a coaxial circular plate to increase the rigidity of the disc. The diamonds can be arranged on each side of the rim and in addition around the thin peripheral edge of the rim.

The diamonds can have particle sizes in the range 80 mesh per linear inch with an aperture width of 0.0073 inch (i.e. 0.185 mm.) to 300 mesh per linear inch with an aperture width of 0.0021 inch (i.e. 0.053 mm.), preferably about 120 mesh per linear inch with an aperture width of 0.0047 inch (i.e. 0.119 mm.).

The spreading means can comprise a roller adjacent the rotary cutter.

A roller can be provided for pressing the block of frozen substance against the support means whilst this block is being fed into engagement with the rotary cutter.

The invention will now be particularly described with reference to the accompanying diagrammatic drawings, in which:

FIGURE 1 is a plan of part of an apparatus according to the invention; and

FIGURE 2 is a section on the line II—II of FIGURE 1.

The apparatus has seven rotary cutters 1 (only five are shown in FIGURE 1) mounted on a rotatable shaft 2. The cutters 1 are spaced apart by spacers 3. Each cutter 1 projects through a slot 4 in a table 5. Each cutter 1 comprises a thin stainless steel disc 6 having an annular rim 7 of sintered material. Diamonds having a mesh size of 120 per linear inch with an aperture width of 0.0047 inch (i.e. 0.119 mm.) are embedded in the rim 7, the diamonds covering both sides of the rim and the thin peripheral edge of the rim. A circular plate 8 is clamped against each side of each disc 6 to increase the rigidity of the disc. The plates 8 are mounted on the shaft 2 coaxially with the discs, the diameter of the plates 8 being just over one half that of the discs 6. A spreading roller 9 is rotatably mounted above the table 5 and behind the cutters 1. The ends of the shaft of the roller 9 are mounted in spring loaded bearings which allow the roller 9 to be resiliently displaced upwards away from the table 5. Six guide rollers 10 are rotatably mounted on a shaft 11 which is parallel to the roller 9 and is disposed above the table 5 in front of the cutters 1. The guide rollers 10 are spaced apart by sleeves 12 so that each roller 10 is arranged between the planes of two adjacent cutters 1. The shaft 11 is spring loaded against upward displacement of the rollers 10.

The operation of the apparatus to cut a slab of deep frozen fish will now be described, the slab having been formed by quick freezing a laminated layer of white fish fillets to about −23° C.

The slab 13 is fed towards the cutters 1 by a hydraulic ram, the sides of the slab being guided by side rails. The guide rollers 10 engage the top of the slab to hold the slab against the table 5. The ram advances the slab 13 past the cutters 1 which are rotating at a high speed, clockwise in FIGURE 2, and make seven parallel cuts through the slab so cutting the slab into eight fingers. The cut slab passes under the spreading roller 9. The fingers of the cut slab are kept apart by rotating separating discs (not shown) which engage in the cuts, these discs being disposed just behind the spreading roller 9. No sawdust is formed as the slab is cut, but instead a milky liquid and paste are formed. Although some of this liquid is thrown into the air by the rotating cutters, most of it collects on the slab adjacent the cuts. The spreading roller resiliently presses down on the top surface of the slab and spreads the liquid and paste over the surface of the slab. The spread layer re-freezes and becomes integral with the cut fingers.

In the above apparatus, the discs 6 each had an outside diameter of 12.7 centimetres and a thickness of 0.08 centimetre and were rotated at 4,000 revolutions per minute giving a peripheral speed of 1,586 metres per minute. The slab was 53 centimetres wide by 38 centimetres long and was fed past the cutters at 4.9 metres per minute. The slab was 2.5 centimetres thick.

What is claimed is:

A method of cutting a slab of deep frozen foodstuff comprising cutting the slab into pieces, while deep frozen with a rotating thin metal disc having diamond particles embedded in the surface of the rim of the disc, the peripheral speed of the disc being greater than 900 metres per minute and producing a wet waste substance at the cutting zone, at least part of said wet waste substance collecting on said pieces of said frozen slab, spreading on said pieces said wet waste substance collected on said pieces and freezing said wet waste substance on said pieces.

References Cited in the file of this patent
UNITED STATES PATENTS

| | | |
|---|---|---|
| 2,073,678 | Broughton | Mar. 16, 1937 |
| 2,752,252 | Condon | June 26, 1956 |
| 2,822,648 | Metzger et al. | Feb. 11, 1958 |
| 2,941,560 | McCaffery | June 21, 1960 |